(12) United States Patent
Gentilini et al.

(10) Patent No.: US 8,740,079 B2
(45) Date of Patent: Jun. 3, 2014

(54) OPTICAL CODE READER

(75) Inventors: Luca Gentilini, Ravenna (IT); Stefano Ciabattoni, Ozzano dell'Emilia (IT); Gabriele Corrain, Bentivoglio (IT)

(73) Assignee: Datalogic Automation Srl, Monte San Pietro (BO) (IT)

( * ) Notice: Subject to any disclaimer, the term of this patent is extended or adjusted under 35 U.S.C. 154(b) by 696 days.

(21) Appl. No.: 12/742,167

(22) PCT Filed: Nov. 12, 2007

(86) PCT No.: PCT/IT2007/000797
§ 371 (c)(1),
(2), (4) Date: May 10, 2010

(87) PCT Pub. No.: WO2009/063510
PCT Pub. Date: May 22, 2009

(65) Prior Publication Data
US 2010/0277330 A1    Nov. 4, 2010

(51) Int. Cl.
*G06K 7/10* (2006.01)
(52) U.S. Cl.
USPC ............. 235/462.01; 235/462.26; 235/462.22
(58) Field of Classification Search
USPC ............... 235/462.01, 462.2, 462.22, 462.23, 235/462.26
See application file for complete search history.

(56) References Cited

U.S. PATENT DOCUMENTS

| 6,399,937 | B1* | 6/2002 | Huang et al. | 250/216 |
| 8,027,096 | B2* | 9/2011 | Feng et al. | 359/666 |
| 2002/0089675 | A1* | 7/2002 | Kamon et al. | 356/623 |
| 2004/0105007 | A1* | 6/2004 | Takagi et al. | 348/207.1 |
| 2006/0180671 | A1 | 8/2006 | Yu | |
| 2006/0196942 | A1 | 9/2006 | Itou et al. | |
| 2006/0198621 | A1 | 9/2006 | Triteyaprasert | |
| 2009/0072037 | A1* | 3/2009 | Good et al. | 235/462.35 |

FOREIGN PATENT DOCUMENTS

EP    0786734 A2    7/1997

OTHER PUBLICATIONS

International Search Report and Written Opinion dated Apr. 28, 2008 for corresponding International Application No. PCT/IT2007/000797.

* cited by examiner

*Primary Examiner* — Edwyn Labaze
(74) *Attorney, Agent, or Firm* — Duane Morris LLP

(57) ABSTRACT

An optical code reader includes a manually operated focusing distance adjustment mechanism, which includes an electronic memory of a configuration parameter representing the desired focusing distance.

30 Claims, 13 Drawing Sheets

OPTICAL CODE READER

FIELD OF THE INVENTION

The present invention regards an optical code reader.

BACKGROUND OF THE INVENTION

In the description hereinafter and in the subsequent claims, the term "optical code" is used to indicate any graphic representation having the function of storing information encoded through suitable combinations of elements of preset, for example square, rectangular or hexagonal, shape, dark coloured (usually black) separated by light coloured elements (spaces, usually white), such as barcodes, stacked codes, that is with several overlapped sequences of bars, and two-dimensional codes in general, colour codes, etc. The term "optical code" also comprises graphic representations detectable not only within the range of visible light, but also in the range of wavelengths comprised between infrared and ultraviolet.

In optical code readers of the scanning type, a light beam, in particular a laser beam, suitably focused by an objective comprising one or more lenses and possibly also one or more aperture stops, is caused to impinge on a deflection system, generally comprised of a rotating or oscillating mirror, to generate one or more scanning lines through the optical code. In other types of optical code readers, the entire optical code is simultaneously illuminated.

The light diffused by the code is collected by proper optics, possibly comprising the same mirror used for scanning and an objective comprising at least one lens, and conveyed onto a photodetector element, which converts the intensity thereof into an electric signal. The pattern of the electric signal over the time during the illumination of the optical code through the scanning line, or the pattern of the electric signal over the space in case of illumination of the entire optical code, indicates the presence or the absence, as well as the mutual size and possibly the colour, of the elements comprising the optical code. Thus, through such electric signal, suitably processed, it is possible to acquire and decode the optical code.

In order for the intensity of the light diffused by the code to effectively represent the constituting elements of the optical code, the luminous spot impinging onto it at each point of the scanning line must be of suitably small size with respect to the size of the elements of the minimum possible size (optical code "module") of the type of optical code being read. In case of readers illuminating the entire optical code, the illuminated area must in any case have characteristics suitable for the acquisition of the optical code.

It follows that the design of the focusing objective determines to a large extent the range of resolution of the optical codes readable by the optical code reader.

In addition, the resolution of the optical codes being equal, the apparent size at the optical code reader depends on the distance between the reader and the optical code being read.

It follows that the design of the focusing objective determines to a large extent also the range of usable reading distances of the optical code reader, or the depth of field.

Given the variety of the conditions of application of an optical code reader, generally it is not possible to define an absolute ideal conduct of the focusing objective, but only an ideal conduct of the focusing objective with respect to the conditions of application, that is with respect to the reading of high, medium or respectively low resolution codes, and with respect to the reading of optical codes at a long, medium or short distance from the optical code reader.

In case of optical code readers provided with static focusing objective, the focusing distance is determined during manufacturing of the reader. The manufacturer thus provides various models of optical code readers having different focusing characteristics. The readers provided with a static focusing objective are, as far as focusing is concerned, extremely accurate and reliable in that they do not have moveable parts, and also individually economical. However, the need to manufacture and store various models increases general costs. Furthermore, from the user's point of view, the optical code readers provided with a static focusing objective are disadvantageous in that they force the user to choose the model in advance and to an integral replacement in case of change of the conditions of application, for example in case the optical code reader requires to be rearranged, for any reason whatsoever, with respect to a conveyor belt of objects marked by optical codes. Choosing the model of each optical code reader in advance is extremely disadvantageous in case of large industrial applications, where there is a plurality of optical code readers.

For these and other reasons, optical code readers provided with a system for adjusting the focusing distance within a given range are known. More in particular, such optical code readers are divided into two classes, those with automatic adjustment and those with manual adjustment.

In both cases, the system for adjusting the focusing distance comprises a mechanism for displacing the focusing objective, or at least one lens thereof, with respect to the light source. With respect to the optical code readers provided with a static focusing distance, the cost and complexity of an optical code reader provided with an adjustable focusing distance are consequently higher, but the production of a complete range of readers is not necessary and, particularly advantageous for the user, each optical code reader is easily adaptable to various conditions of application.

In case of optical code readers provided with an automatic adjustment of the focusing distance, the displacement mechanism comprises an electrical actuator, for example a linear electrical motor.

The operation of the electrical motor can be controlled, during normal functioning of the optical code reader, depending on the distance of the code to be read, detected automatically by the optical code reader itself or by a distance measurer associated thereto. Such optical code readers provided with "dynamic" adjustment of the focusing distance are also known as readers with autofocus. An optical code reader provided with autofocus is for example described in EP 0 786 734 A2.

The optical code readers provided with an automatic adjustment of the focusing distance can also be underused, setting the desired focusing distance only in a configuration or installation procedure, by setting an operation parameter of the optical code reader. In case of this adjustment of the "static" type, during normal operation the optical code reader automatically maintains such desired focusing distance.

The optical code readers provided with an automatic adjustment of the focusing distance are obviously extremely versatile with respect to the application conditions and, in case of autofocus, they allow optimal reading performance even in applications where there is a wide range of variability of the reading conditions.

However, with respect to the optical code readers provided with static focusing distance, they are more complex and substantially more costly, due to the presence of the electric actuator and the related controller. In addition, they have a potential drop of reliability due to the presence of the actuator itself.

In most industrial applications, for example applications for sorting objects in automatic warehouses, applications on production lines and small conveyor belts, etc, the optical code readers are typically mounted on special supports, over object moving means, such as conveyor belts.

In most of such applications, the reading distance range is limited by the variability of the size of the objects, and the depth of field of an optical code reader is generally enough to cover such range. In these cases the optical code readers provided with automatic adjustment of the focusing distance, in particular with autofocus, are overdesigned and at the same time potentially less strong and reliable.

In such applications, the optical code readers provided with manual adjustment of the focusing distance represent the best compromise in terms of versatility, costs, reliability and construction simplicity, allowing for variable reading distances, but being free of electric actuators.

In case of optical code readers provided with manual adjustment of the focusing distance, the displacement of the focusing objective to change the focusing distance occurs through a manually operated element, such as a screw coupled to a female screw.

Manual adjustment of the focusing distance generally occurs during the step of installation of the optical code reader, in such a manner to adapt it to the characteristics of the application. Such installation procedure requires the intervention of a sufficiently skilled operator, capable of estimating the suitability of the focusing upon a preliminary analysis of the application and of the characteristics of the optical code reader, in particular the reading diagrams depending on the reading distance and the resolution of the code.

Manual adjustment of the focusing distance during the step of installation of the optical code reader can be facilitated by indicating the current focus position to the installer, for example through a mechanical system such as a graduated scale in the proximity of the adjustment screw or an electronic system such as a position sensor correlated to the focusing objective or to a moveable part of the focusing adjustment system, whose output is suitably processed by the electronic system of the reader and displayed on a display device such as a display.

In order to guarantee maintenance of the reading performance of the optical code reader, the adjustment performed during the step of installation must however remain unchanged during normal operation of the reader after installation, the application conditions being equal.

To this end, the manual operated element, generally, is not directly accessible at the outside of the housing of the reader, rather it is in a recessed position inside the same, typically accessible only upon removal of a suitable protection element such as a plug or cover. Said protection element has the double function of concealing the adjustment system itself in order to avoid inadvertent actuation, and preventing it from being tampered with, as well as ensuring sealing of the reader with respect to the external elements such as water and dust. Thus, by its nature, the protection element is a hindrance during the required and intentional manual adjustment, in that it entails the need of removing it and the risk of improperly remounting it thus jeopardising its sealing function.

However, regardless of inadvertent actuation of the manual element, manual adjustment of the focusing distance set during the installation of the optical code reader can be lost due to vibrations, for example transmitted by a conveyor belt on which the reader supporting structure is fixed, or due to impacts caused by people or objects, such as the packages moving on the conveyor belt.

In case of optical code readers provided with manual adjustment of the focusing distance of the prior art, loss of the adjustment carried out during the step of installation can seriously jeopardise the reading performance of the optical code reader. In case of applications in which there is an optical code reader operator, the latter must undertake to estimate the degree of the drop of performance and understand that the drop of performance is due to loss of the adjustment of the focusing distance, then request the intervention of a more skilled operator who shall undertake restoration of the adjustment. Furthermore, the problem of loss of the adjustment of the focusing distance is particularly serious in case of applications of the "unattended scanner" type, where there is no constant supervision by the personnel in charge of the optical code reader, in that the drop of performance can lead to a costly stop of the conveyor belt or of the production line.

The subsequent manual focusing adjustment is, in case of the optical code readers of the prior art, still quite a slow and demanding procedure, requiring as mentioned beforehand the intervention of a skilled operator.

Thus, the technical problem at the basis of the present invention is to overcome the outlined drawbacks of the prior art, providing an optical code reader provided with a variable focusing distance and hence versatile with respect to the application conditions, being both of a low cost and high reliability and easy to manufacture, but that simplifies the adjustment of the focusing distance and in particular allows an easy and quick restoration of the focusing distance adjustment in case of loss thereof.

SUMMARY OF THE INVENTION

In a first aspect, the invention regards an optical code reader comprising a manually operated focusing distance adjustment mechanism, characterised by comprising an electronic memory of a configuration parameter representing the desired focusing distance.

By being provided with manual adjustment of the focusing distance and thus excluding the need for an electric actuator, the optical code reader of the invention is inexpensive, simple and reliable, still being more versatile than optical code readers provided with a static focusing distance. Nevertheless, through the provision of storage of the configuration parameter representing the desired focusing distance, the focusing distance adjustment operations and in particular the subsequent operations for restoring the adjustment in case of loss of the same, are remarkably facilitated. Indeed, said desired focusing distance can be stored in the optical code reader by a host computer or another remote storage device or through the optical code reader itself, and thus it can be made available to the user, for example by being displayed on a display of the optical code reader; thus the user does not need to be particularly skilled expertise and can immediately perform the focusing adjustment according to such desired distance during the step of installation or restoration of the adjustment.

Furthermore, storage of the value of the parameter indicating the desired focusing distance allows such value to be included in a backup procedure on a host computer or another remote storage device and possibly adapted to perform controller operations, purposely provided for and supplied along with the reader; the value subjected to backup can be subsequently downloaded into the same optical code reader through a restore procedure, or in a spare reader in case of replacement, or also into other analogous readers in an optical code reading system comprising several readers arranged at an identical distance from a reading position or an average reading position, with evident advantages.

Thus, advantageously, the optical code reader comprises display means and a processor provided with focusing management program code means adapted to display on said display means the value of the configuration parameter representing the desired focusing distance stored in said electronic memory.

In addition, advantageously, the optical code reader comprises a communication interface with a host computer for communicating the value of the configuration parameter representing the desired focusing distance.

Besides the abovementioned backup and restore or download procedures, the communication interface also allows programming through the host computer the value of the configuration parameter representing the desired focusing distance.

In order to facilitate the user during manual adjustment of the focusing distance, the optical code reader can comprise a user interface and a processor provided with focusing management program code means adapted to detect the current value of the focusing distance and visually display through said user interface the current focusing distance detected cyclically during the manual operation of said focusing distance adjustment mechanism.

Preferably, in such case the focusing management program code means are additionally adapted to store in said electronic memory the value currently detected upon receipt of a storing instruction through said user interface.

Alternatively, the focusing management program code means are additionally adapted to store in said electronic memory the value currently detected at the end of the manual operation of said focusing distance adjustment mechanism.

Advantageously the focusing management program code means are adapted to store in said electronic memory the currently detected value when the detected value is constant for a preset number of said cyclic detections.

According to an equivalently advantageous alternative, the focusing management program code means are adapted to store in said electronic memory the currently detected value when the cyclically detected value is constant for a preset period of time.

According to a further particularly advantageous alternative, the focusing management program code means are adapted to store in said electronic memory the currently detected value upon receipt of a storing instruction encoded in an optical code.

According to an alternative embodiment to allow input of the value of the configuration parameter representing the focusing distance, the optical code reader comprises a user interface and a processor provided with focusing management program code means adapted to propose through said user interface each time one of a plurality of values for said configuration parameter representing the focusing distance, to receive through said user interface an instruction accepting the currently proposed value, and to store in said electronic memory the currently proposed value upon receipt of said accepting instruction.

In another alternative embodiment to allow input of the value of configuration parameter representing the focusing distance, the optical code reader comprises a processor provided with focusing management program code means adapted to store in said electronic memory a value of the parameter indicating the focusing distance encoded in an optical code, in response to a storing instruction encoded in said optical code.

While in the above mentioned cases the user is required to know the desired focusing distance value in advance, in order to provide supplementary help to the user, the optical code reader can advantageously comprise a user interface and a processor provided with focusing management program code means adapted to cyclically display through said user interface a percentage of successful results of a plurality of reading attempts of a sample optical code, and to detect the current value of the parameter indicating the focusing distance and to store it in said electronic memory upon receipt of a storing instruction when said percentage of successful results is satisfactory.

During the cycle of reading attempts and indication of the percentage of successful results, the user shall undertake a manual adjustment of the focusing distance, checking whether the percentage of successful results raises, drops or remains substantially constant, up to the obtainment of the maximum percentage of successful results or in any case of a satisfactory value in one or more points of the intended reading field.

In this manner, the value of the parameter indicating the desired focusing distance can be entirely transparent and unknown to the user.

In such case the focusing management program code means can be adapted to receive said storing instruction through said user interface.

Alternatively, the focusing management program code means can be adapted to receive said storing instruction from the detection of the end of the manual operation of said focusing distance adjustment mechanism.

Advantageously the focusing management program code means are adapted to store in said electronic memory the currently detected value when the detected value is constant for a preset number of said cyclic displays.

According to an equivalently advantageous alternative, the focusing management program code means are adapted to store in said electronic memory the currently detected value when the cyclically detected value is constant for a preset period of time.

According to another particularly advantageous alternative, the focusing management program code means are adapted to receive said storing instruction encoded in an optical code.

In such case, the user shall replace the sample optical code used during the manual adjustment with a specific optical code, encoding such storing instruction.

Thanks to the storage of the parameter indicating the desired focusing distance, a diagnostic function for the adjustment of the focusing distance can additionally be advantageously implemented in the optical code reader of the invention.

Thus, advantageously the focusing management program code means are additionally adapted to detect the current value of the focusing distance, to compare it with the value of the configuration parameter representing the desired focusing distance stored in the memory location and, when the difference between said two values is not null or greater than a threshold, to provide a mismatch alarm signal.

Thus the person in charge of, or the supervisor of the, optical code reader is automatically warned, visually and/or acoustically, of the necessity to perform a manual adjustment of the focusing distance to restore the desired one stored during the step of installation, when the latter is lost due to impacts, vibrations or due to inappropriate operation of the focusing distance manual adjustment mechanism.

The threshold can be selected from the group consisting of an absolute value set in the factory, a value expressed as a percentage set in the factory of the value of the configuration parameter representing the desired focusing distance stored in the memory location, or an absolute or percentage value which can be configured by the user.

Advantageously, the optical code reader may comprise a communication interface with a host computer, and the focusing management program code means are adapted to provide said alarm signal through said communication interface.

Delivery of the alarm signal to the host computer is particularly advantageous in applications where an on-site operator is not provided for, such as typically applications on conveyor belts, namely in the case of an optical code reader of the so-called unattended scanner type.

Alternatively or additionally, the optical code reader comprises display means, and the focusing management program code means are adapted to provide said alarm signal through said display means.

Advantageously, the focusing management program code means are additionally adapted to cyclically perform said detection, comparison and alarm signal provision.

In this manner, the mismatch alarm signal continues to be provided until the manual adjustment is performed and also until the adjustment performed is such as to restore the match, possibly apart from the threshold. Thus, the adjustment itself is facilitated in that the end of the alarm signal indicates achievement of the desired focusing distance.

Advantageously, the alarm signal can indicate said difference between the current value of the focusing distance and the value of the configuration parameter representing the desired focusing distance stored in the memory location.

Alternatively or additionally, the alarm signal can indicate the direction according to which the manually operated focusing distance adjustment mechanism must be operated to restore the match between the current value of the focusing distance and the value of the configuration parameter representing the desired focusing distance stored in the memory location.

The configuration parameter representing the desired focusing distance stored in the memory can be selected from the group consisting of: a distance between an input/output window of the optical code reader and the reading position or average reading position of the optical codes; an output value of a position sensor of an element of the focusing adjustment mechanism; a position of a manually operated element of the focusing adjustment mechanism.

The first alternative is particularly natural for the user, the second alternative facilitates the above described diagnostic function in that it is necessary to convert such value into the physical distance only for display to the user, while the third alternative is harder to convert into the physical distance, but it can remarkably facilitate the adjustment operation for the user, obviously providing for a corresponding graduated scale at the manually operated element of the focusing adjustment mechanism.

In a particularly advantageous manner, the optical code reader comprises a user interface, and a processor provided with focusing management program code means adapted to interact with said user interface, a manually operated element of said focusing adjustment mechanism and said user interface being arranged on a same wall of a housing of the optical code reader.

In such manner, during the manual focusing adjustment, the user has at his/her disposal the described visual indications immediately visible, and one or more buttons at his disposal for entering the above described commands.

In addition, preferably a manually operated element of said focusing adjustment mechanism is directly accessible at the outside of a housing of the optical code reader.

Such a provision facilitates the user during the intentional adjustment and allows sealing of the housing to be ensured, while an inadvertent or undue adjustment jeopardising the performance of the optical code reader is in any case immediately signalled and thus rectified thanks to the described focusing distance diagnostic function.

Preferably, the focusing distance adjustment mechanism operates on the illumination optics of the optical code reader.

The invention also regards, in another aspect thereof, a method of diagnostics of the adjustment of the focusing distance in an optical code reader provided with a manually operated focusing distance adjustment mechanism, comprising one or more steps corresponding to the ones to which the above described focusing management program code means are adapted.

BRIEF DESCRIPTION OF THE DRAWINGS

Characteristics and advantages of the invention shall now be illustrated with reference to an embodiment represented, by way of a non-limiting example, in the attached drawings, wherein.

DETAILED DESCRIPTION

Figure 1:
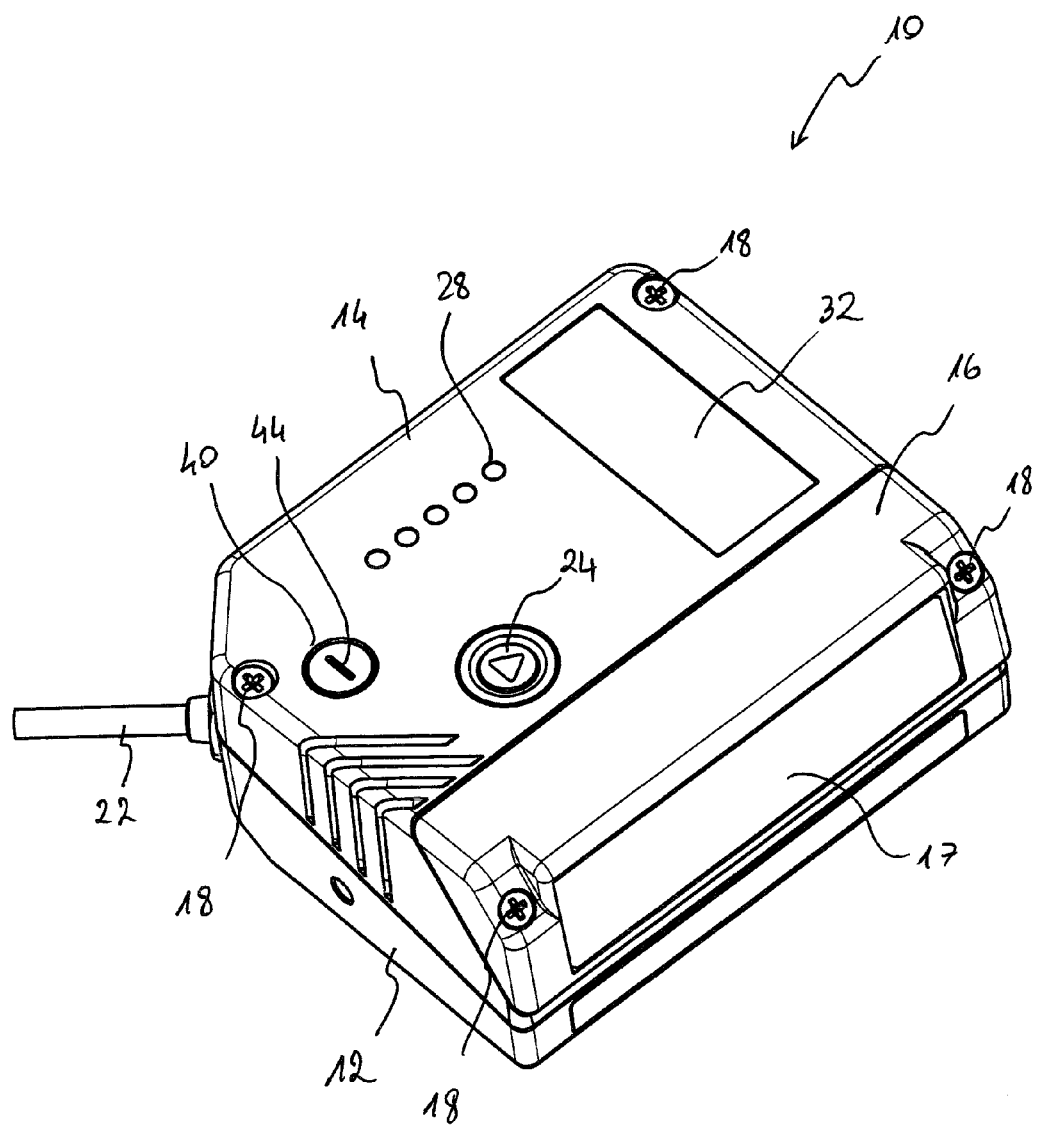
FIG. 1 is a perspective view of the optical code reader according to the invention in the assembled state.

With reference in particular to FIG. 1, an optical code reader 10 according to the invention first comprises a housing consisting of three housing parts: a base part 12 and two cover parts 14 and 16.

Figure 2:
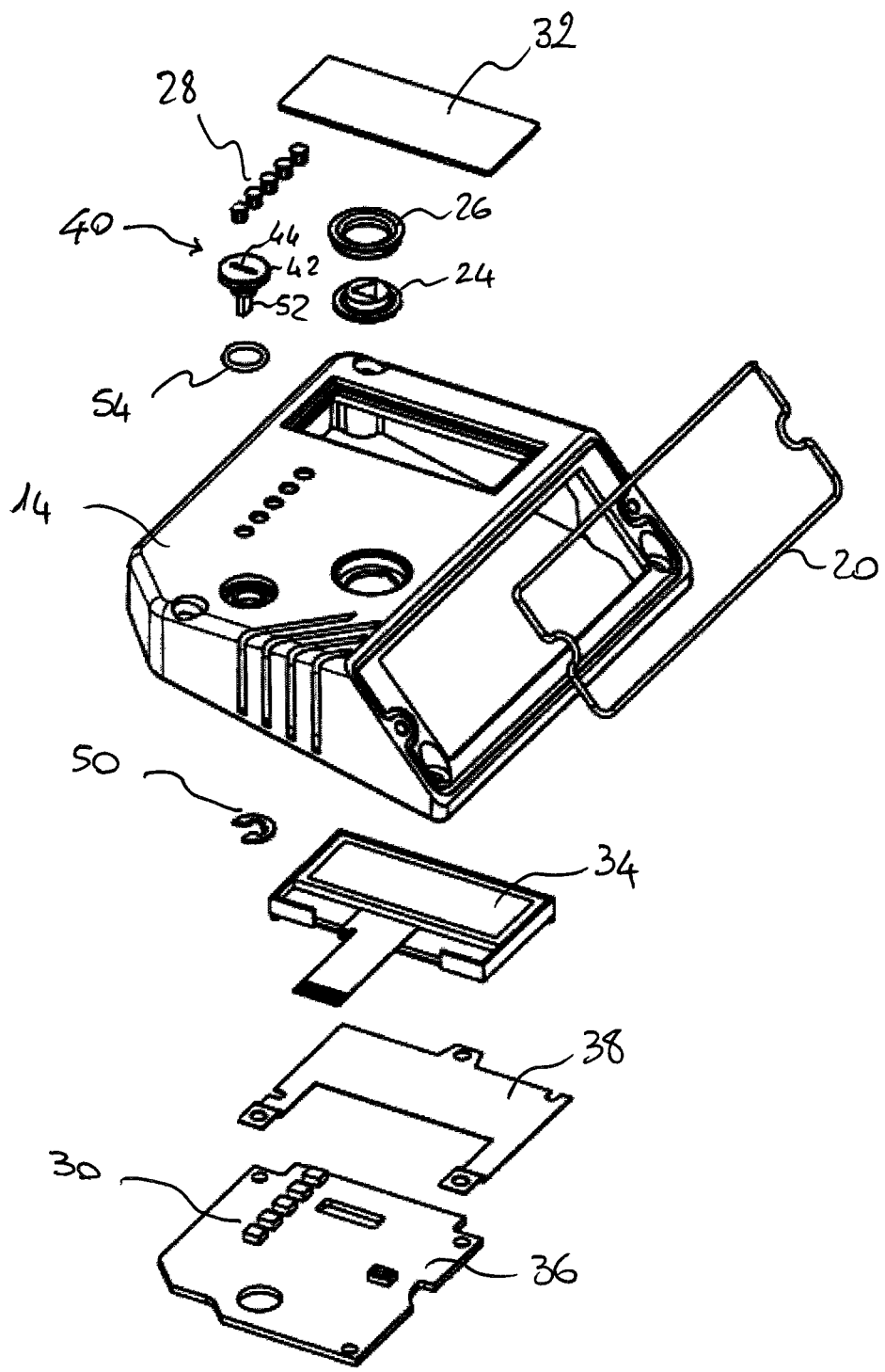
FIGS. 2-4 are exploded views of some components of the optical code reader of FIG. 1.

The three housing parts are assembled together, for example by means of screws such as the screws 18 shown in FIG. 1, with the interposition of gaskets, of which a gasket 20 is shown between the two cover parts 14 and 16 in FIG. 2, in such a manner as to form a sealed housing, from which a power supply and/or data transmission cable 22 protrudes.

The second cover part 16 is provided with a window 17, made of glass or transparent plastic, for output of the light for illuminating the optical code to be read and input of the light diffused by the optical code.

Providing the input/output window 17 on a dedicated part of the housing 16 allows accessories such as mirrors for deflecting the scanning line to be mounted or replaced in case of breakage or damage, without interfering with the remaining components of the reader 10 described subsequently.

Also with reference to FIG. 2, at the first cover part 14 a user interface is provided, comprising in the illustrated embodiment a button 24 mounted by means of a blocking bush 26, a plurality of light guides 28 associated to respective LEDs 30, and a window 32 made of glass or transparent plastic associated to a display 34, for example an LCD display with two lines of 16 characters each.

The button 24 and the display 34 are connected to respective control and command electronic components (not shown) on a PCB 36 also bearing the LEDs 30.

Furthermore, FIG. 2 shows a metal sheet 38 for fixing the display 34 to the first cover part 14.

The user interface provided at the first cover part 14 further comprises a manual focusing adjustment element 40, directly accessible at the outside of the housing of the optical code reader 10, without requiring removal of elements of the housing or a plug, which might thereafter not be properly repositioned.

It is emphasised that the manual focusing adjustment element 40 is arranged on the same wall of the housing of the reader 10 on which the other user interface elements are arranged, which results particularly advantageous for the reasons that will appear hereinbelow.

Figure 3:
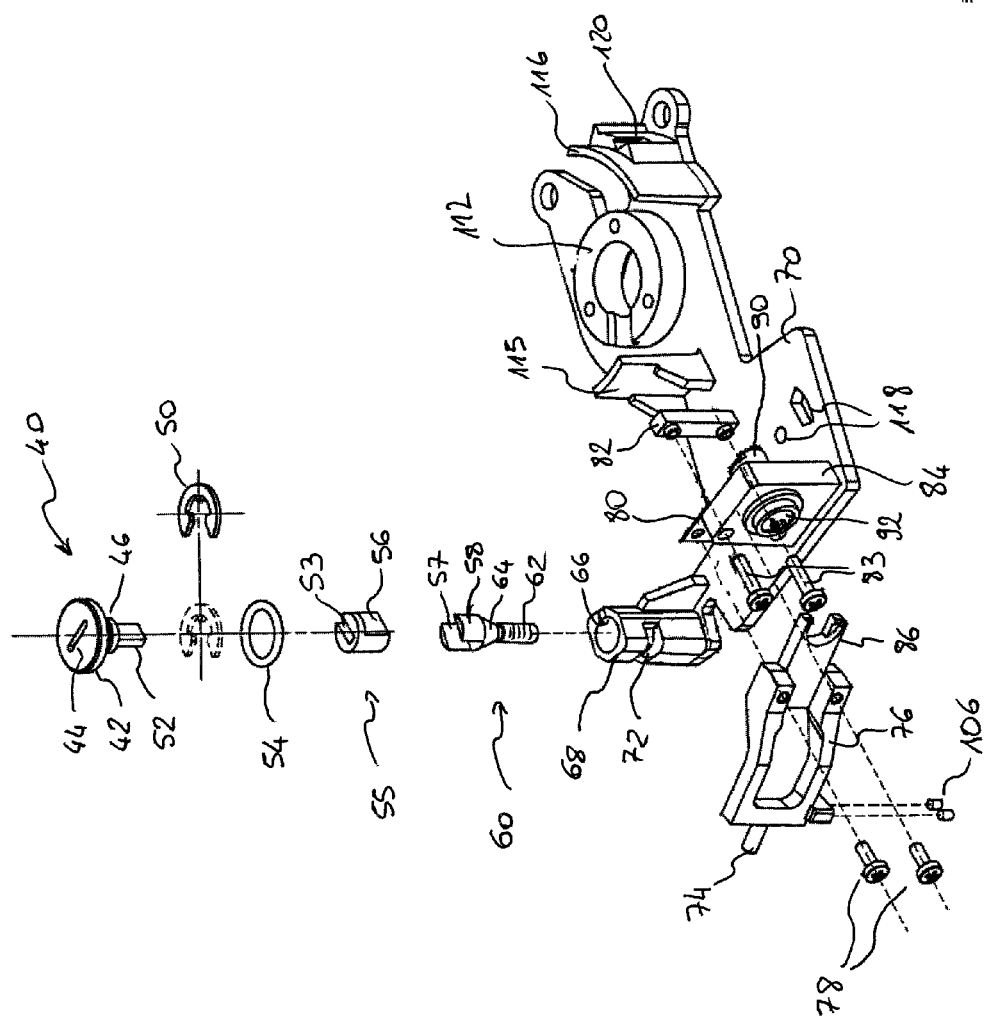

With reference also to FIG. 3, the manual focusing adjustment element 40 is provided with a substantially flat head 42 having a slot 44 for a screwdriver, a collar 46 provided with an annular groove 48 for axial fixing in the first cover part 14 by means of a Seeger ring 50, and a rectangular-cross-section shank 52.

An O-ring 54 is arranged between the manual focusing adjustment element 40 and the first cover part 14. The O-ring 54 has the advantageous double function of keeping the sealing of the housing of the reader 10 tight at the manual focusing adjustment element 40 and of hindering the inadvertent rotation of the element 40 itself upon vibrations or impacts.

The rectangular-cross-section shank 52 of the manual focusing adjustment element 40 is inserted in a split 53 of an intermediate element 55 also provided with a rectangular cross-section shank 56.

The shank 56 of the intermediate element 55 is inserted in a split 57 of a head 58 of a shaped screw 60. The shaped screw 60 is provided with a cylindrical shank 62 threaded at one end, and, between the head 58 and the shank 62, with a cone-shaped surface 64.

The shaped screw 60 can be screwed to different depths into an internally threaded portion of a hole 66 of a guide 68 raised from a metallic plate 70 supported by the housing base part 12, and which supports in turn in predetermined positions the optical and optoelectronic components of the reader 10 and a second PCB 71 (FIGS. 5-8) provided with the electronic components for the control and drive thereof and for processing and storing.

The intermediate element 55 is made of electrically insulating material, for example plastics, to electrically decouple the manual adjustment element 40 from the metallic plate 70.

The guide 68 is provided with a transverse cutting 72 passing through to the hole 66, at a portion of the hole 66 adjacent to the internal threading and having a larger section than the latter, sized to accommodate the portion of the shaped screw 60 provided with the cone-shaped surface 64. More in particular a different portion of the cone-shaped surface 64 of the shaped screw 60 faces the transverse cutting 72 depending on the screwing depth thereof, as better shown in FIG. 8.

A cylindrical profile follower 74, projecting from a first end of a focusing adjustment transmission element 76, is inserted into the transverse cutting 72 of the guide 68.

More in detail and with reference in particular to FIG. 3, said focusing adjustment transmission element 76 consists of a bracket fixed at an intermediate portion thereof, for example by means of screws 78, to a flat spring 80 in turn fixed, through a fixing block 82 and screws 83, onto a support protrusion 84 raised from the plate 70.

At the end opposite to the one on which the profile follower 74 protrudes, the transmission element 76 comprises a fork 86.

Figure 4:
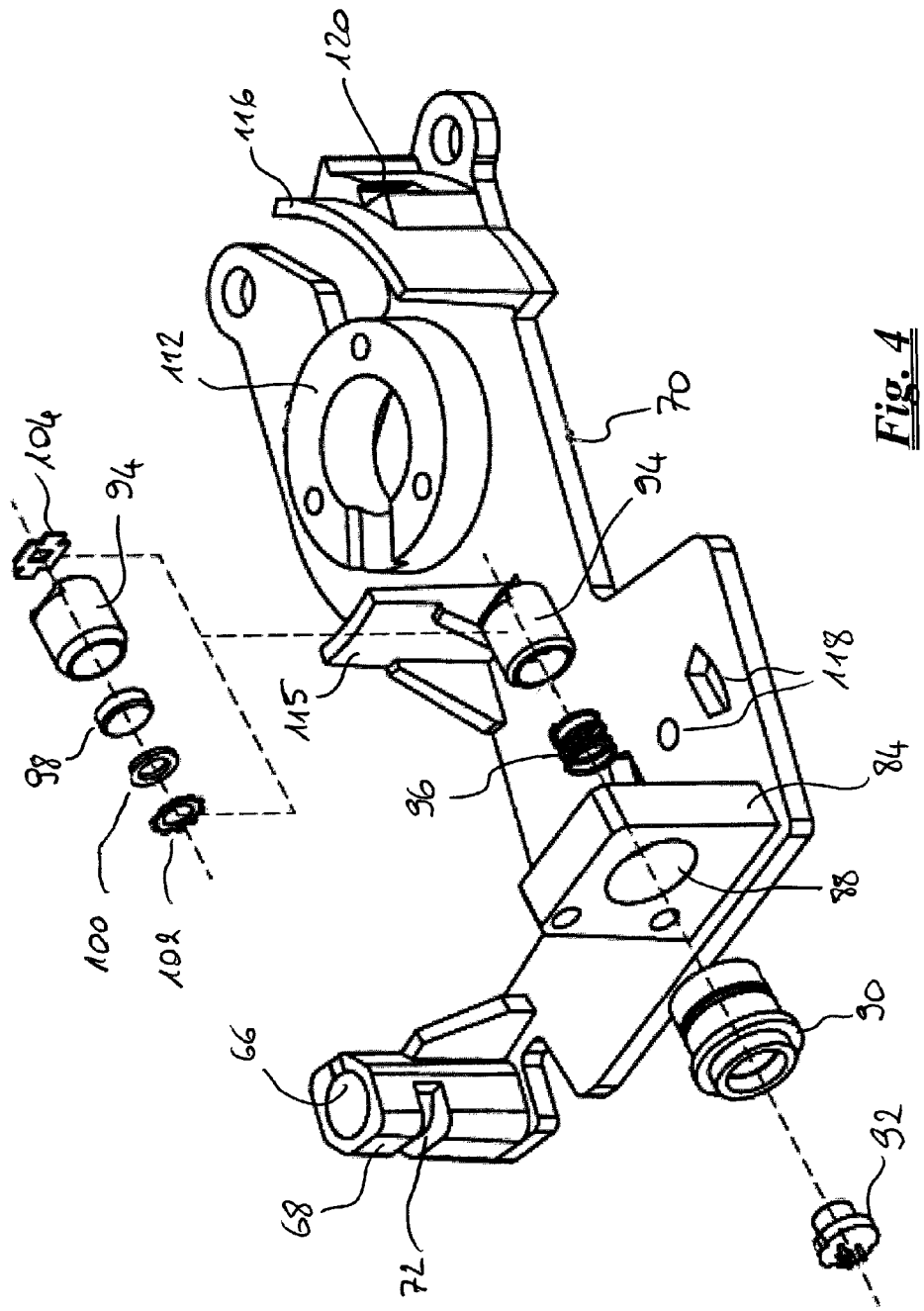
Figure 5:
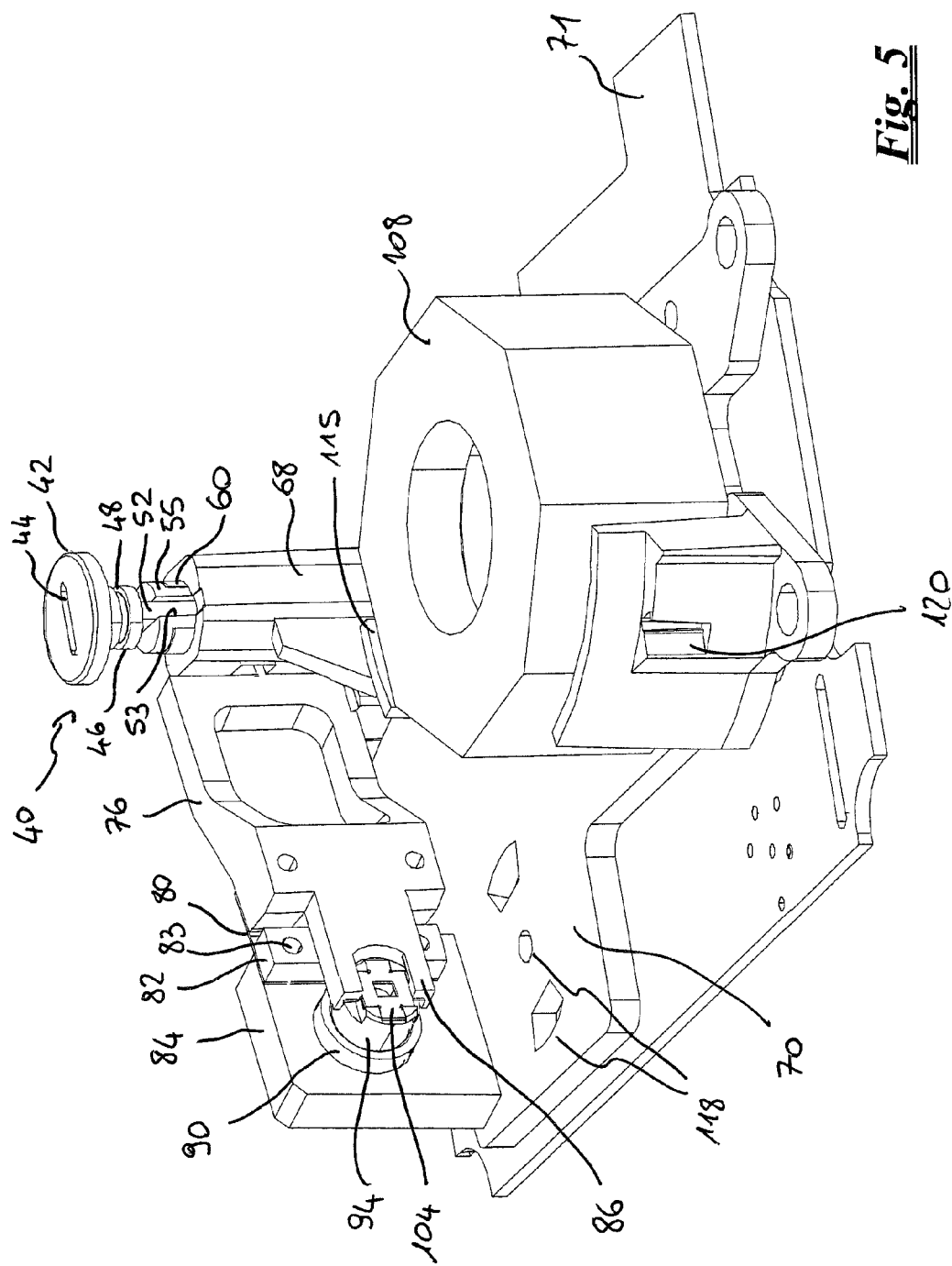
FIGS. 5-8 are partial perspective views, according to different orientations, of some components of the optical code reader of FIG. 1.
Figure 6:
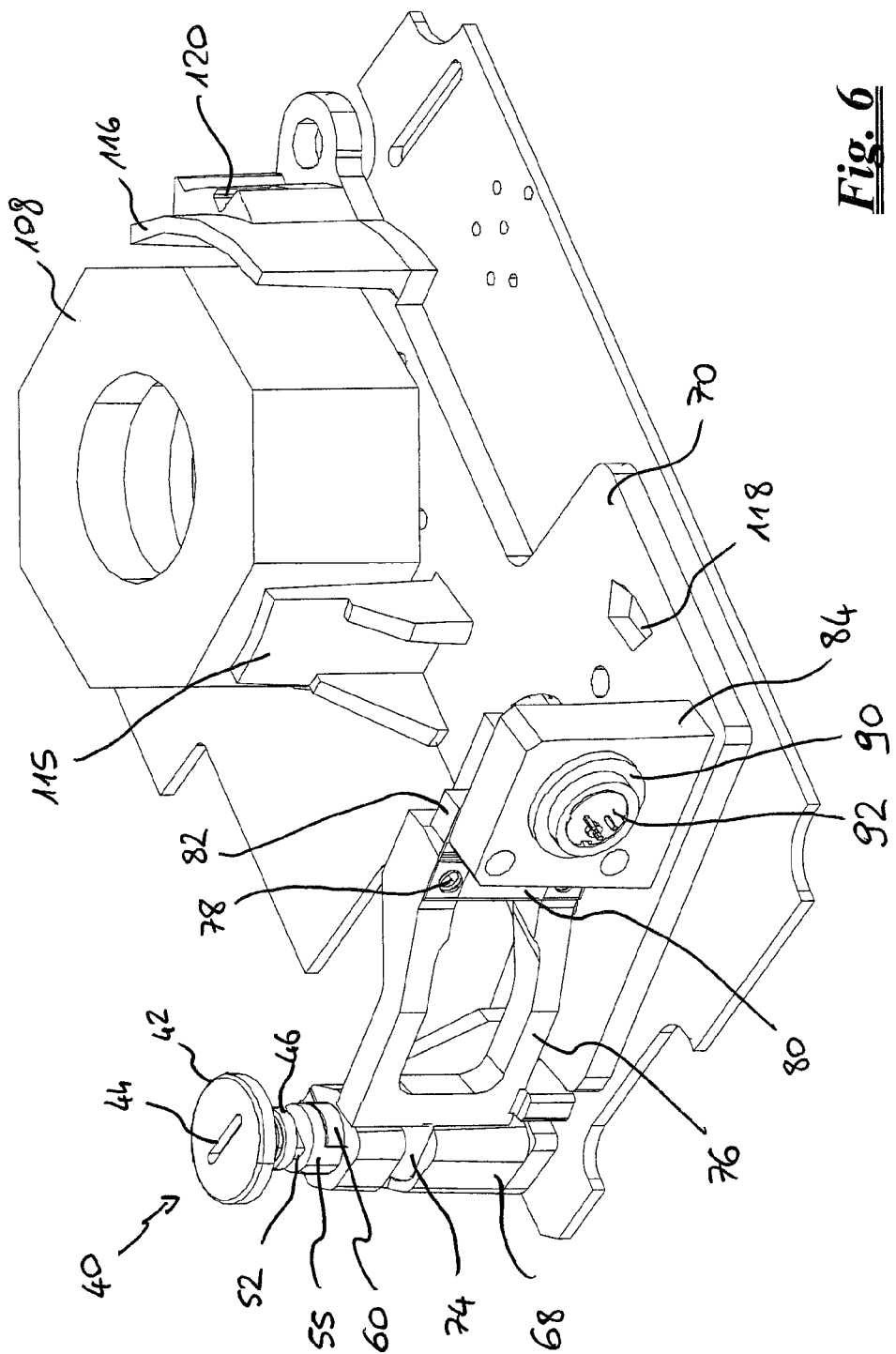
Figure 7:
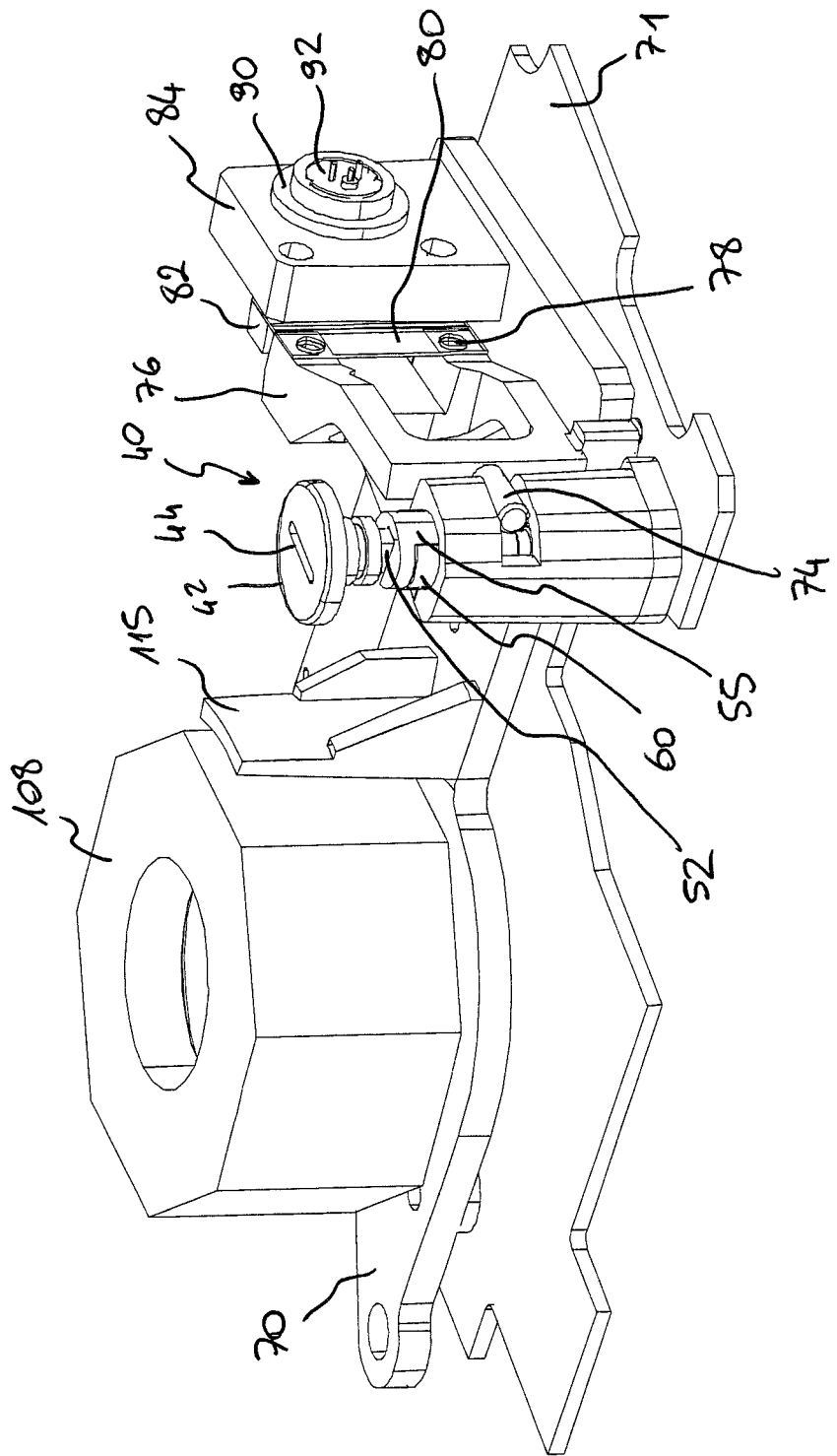
Figure 8:
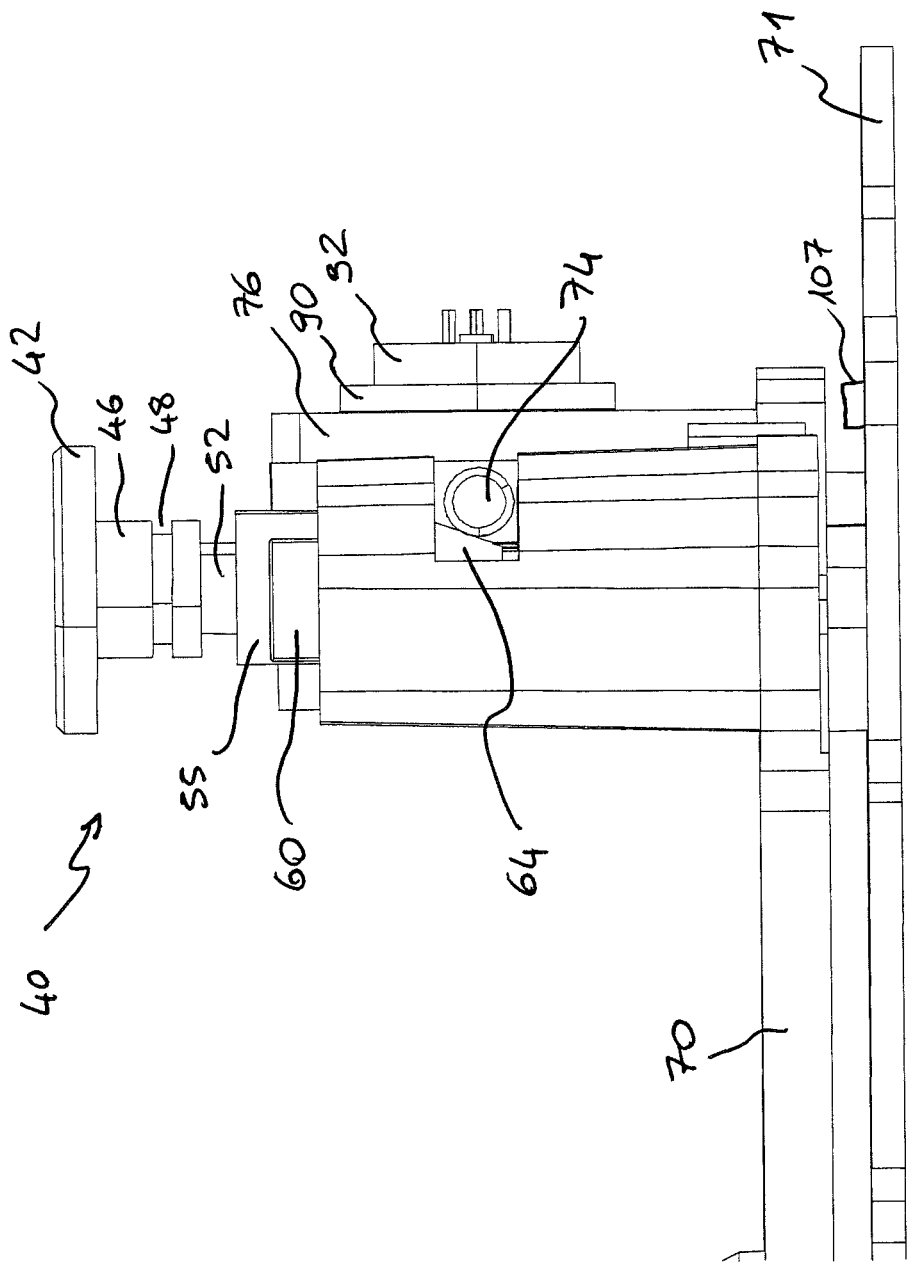

With reference in particular to FIG. 4, the support protrusion 84 raised from the plate 70 comprises a transverse hole 88 within which a hollow cylindrical support 90 is housed. The support 90 supports in a fixed manner, on one side of the support protrusion 84, a diode laser light source 92 and, on the other side of the support protrusion 84, it supports in a sliding manner a barrel objective 94. A helical compression spring 96 is inserted into the support hole 90 between the light source 92 and the barrel objective 94.

More in detail, the barrel objective 94 comprises, as shown in FIG. 4, a focusing lens 98 for the light emitted by the light source 92, a nylon washer 100, a spring 102 for blocking the focusing lens 98, and a suitably shaped diaphragm 104.

The fork 86 of the focusing adjustment transmission element 76 embraces the barrel objective 94 a the side opposite the side contacting the helical compression spring 96.

At the end from which the profile follower 74 projects, the transmission element 76 further comprises a pair of magnets 106 (FIG. 3), cooperating with a Hall sensor 107 (FIG. 8, 9) arranged on the second PCB 71.

Manual focusing adjustment is performed as follows.

The profile follower 74 follows the cone-shaped surface portion 64 facing from the transverse cutting 72 of the guide 68. Therefore, as the screwing depth of the shaped screw 60 in the guide 68 increases, in turn as determined by the rotation angle of the manual focusing adjustment element 40 in a first direction, the transmission element 76 is proportionally moved against the action of the flat spring 80. The fork 86 of the transmission element 76 leaves the barrel objective 94 proportionally free to move away from the light source, sliding within the support 90 under the action of the helical compression spring 96. Thus, the focusing distance of the reader 10 decreases.

On the contrary, as the screwing depth of the shaped screw 60 in the guide 68 decreases, again as determined by the rotation angle of the manual focusing adjustment element 40 in the opposite direction, the transmission element 76 is proportionally left free to be moved under the action of the flat spring 80. The fork 86 of the transmission element 76 slides the barrel objective 94 within the support 90 towards the light source 92, against the action of the helical compression spring 96. Thus, the focusing distance of the reader 10 increases.

The Hall sensor 107 detects the position of the pair of magnets 106 and thus of the focusing adjustment transmission element 76, and hence provides an output indicative of the focusing adjustment position.

Therefore, the transmission element 76 substantially operates like a lever of the second type.

It is noted that the focusing adjustment as described above is particularly fine and accurate. In particular, the support 90 imposes on the barrel objective 90 a perfectly rectilinear movement, while the coupling between the cone-shaped surface 64 of the shaped screw 60 and the profile follower 74 allows optimisation of the transmission ratio between the rotating movement of the manual adjustment element 40 and the rectilinear movement of the barrel objective 94. In other words, it is possible to use advantageously high rotation angles of the manual adjustment element 40 to obtain small movements of the barrel objective 94.

Furthermore, the movement axis of the barrel objective 94 is perpendicular to, but not intersecting with, the forward movement axis of the shaped screw 60, thus allowing accommodation of the shaped screw 60 on a wall of the optical code reader 10 adjacent to the wall provided with the input/output window 17 of the optical code reader 10. Therefore, though provided with all the elements for interaction with the user on the same wall, as noted above, the optical code reader is particularly compact.

Preferably, on the cover part 14 at the manual focusing distance adjustment distance element 40, for example around it, there are indications such as clockwise and anticlockwise arrows and writings such as "NEAR", "FAR" to help the user during the adjustment of the focusing distance.

As mentioned, besides the light source 92 and the barrel objective 94, the plate 70 also supports at preset positions the other optical and optoelectronic components of the reader 10.

Figure 9:
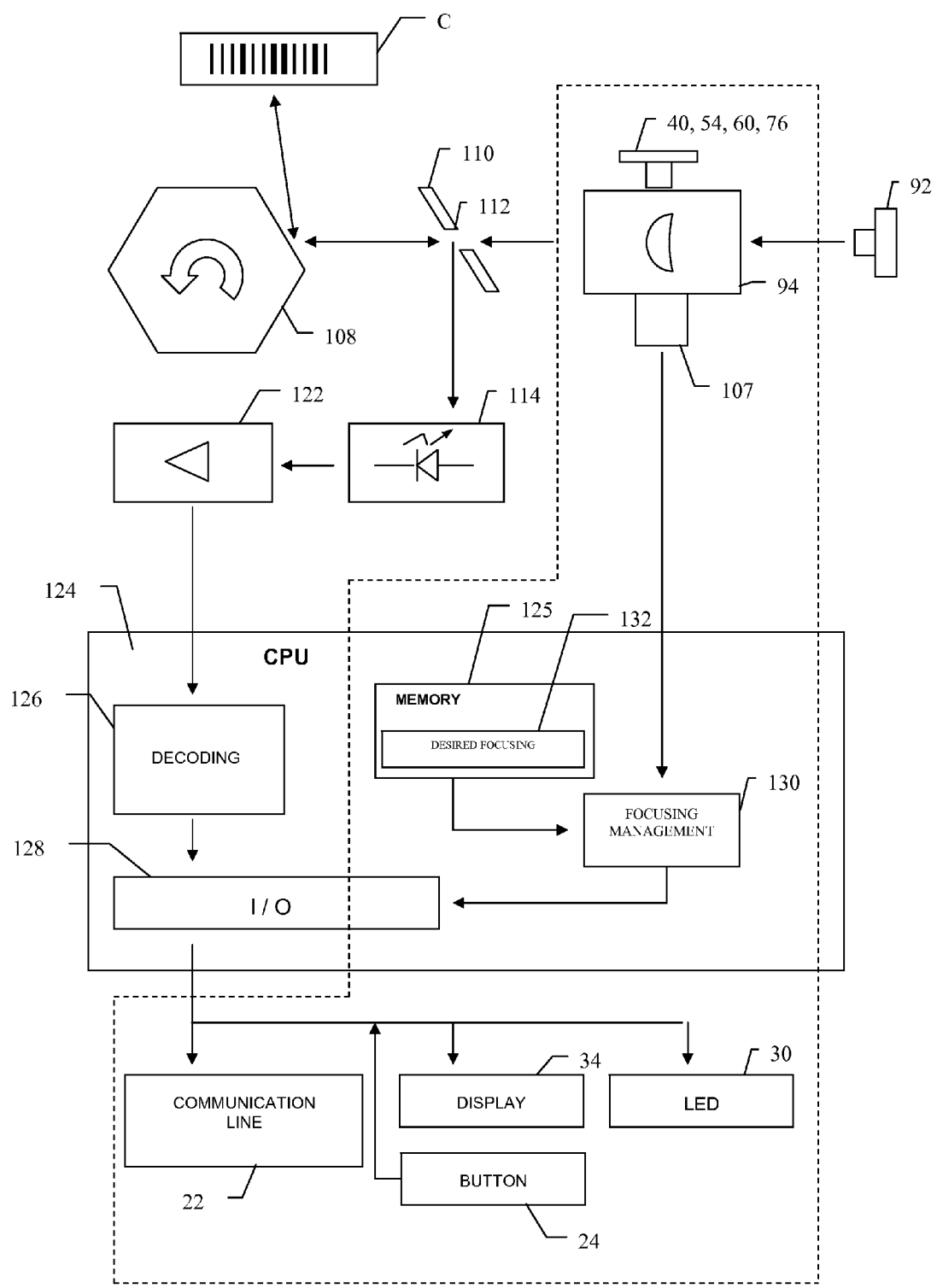
FIG. 9 is a block diagram of the components of the optical code reader of FIG. 1.

With reference in particular to FIG. 9, said components comprise, in a per se well known manner, a rotating polygonal mirror 108, operated by an electrical motor not shown, for deflecting the light beam emitted by the light source 92 thus generating the scanning lines of the optical code C, a mirror 110 for collecting and deflecting the light diffused by the optical code, provided with a hole 112 for the passage of the light emitted by the light source 92, and a photodetector device 114, for example one or more photodiodes or a CCD or C-MOS device, for receiving the light diffused by the optical code, deflected by the polygonal mirror 108 and by the collecting and deflecting mirror 110, and generating an electrical signal indicating the intensity thereof.

The motor for rotating and supporting the rotating polygonal mirror 108 is fixed onto the plate 70 at a basement 112, around which screens 115, 116 for rejecting the light coming from impurities of the optical elements are arranged.

The collecting and deflecting mirror 110 is fixed onto the plate 70 at holes 118 in the proximity of the barrel objective 94.

The photodetector device 114 is mounted on a PCB (not shown) in turn fixed onto the screen 116 at a split 120.

Furthermore, FIG. 9 schematically shows the electronics of the optical code reader 10, comprising an amplifier/digitizer 122 of the output signal of the photodetector device 114, and a processor or CPU 124 provided with a memory 125. The processor 124 comprises in particular a functional block 126 for decoding the optical codes which processes the output signal of the amplifier/digitizer 122, an input/output functional block 128, which controls the communication with a host processor through the serial interface provided in the cable 22 and with the user interface comprising the button 24, the LEDs 30 and the display 34, as well as a focusing management functional block 130, better described hereinafter.

The memory, which can include one or more types of memories such as flash, RAM, ROM, EEPROM memories, stores both the program code for the operation of the reader 10, and the service constants and variables used during the performance of such program code, possibly including the information encoded in the optical codes, as well as the values of some configuration parameters of the reader 10.

Among the configuration parameters, the following are cited by way of an example: the type or types of optical codes which can be read by the reader 10, the characteristic parameters of the communication channels towards the external, the format and the protocol of the data sent through these channels, any parameters for the optimisation of the amplifier/digitizer 122.

According to the present invention, among the configuration parameters there is a configuration parameter representing the desired focusing distance; in FIG. 9 a memory location adapted to store its value, set in the manner described subsequently, is indicated with reference number 132.

The configuration parameter representing the desired focusing distance, some times hereinafter indicated with the same reference number 132, is the focusing distance itself, intended as a linear measurement, expressed in centimeters and/or inches, between the input/output window 17 of the reader 10 and the reading position or average reading position of the optical codes. Indeed it should be noted that the distance inside the reader 10 between the light source 92 and the input/output window 17 is a constant value.

Impacts and vibrations can cause the movement of the mechanical components of the focusing system, comprising the manual focusing distance adjustment element 40 and the shaped screw element 60 integrally rotating therewith, the transmission element 76 and the barrel objective 94, besides its support 90 and the springs 80, 96. Furthermore, given that the manual focusing distance adjustment element 40 of the reader 10 is directly and easily accessible at the outside of the housing of the reader 10, someone could inadvertently or fraudulently, modify the focusing adjustment.

Figure 10:
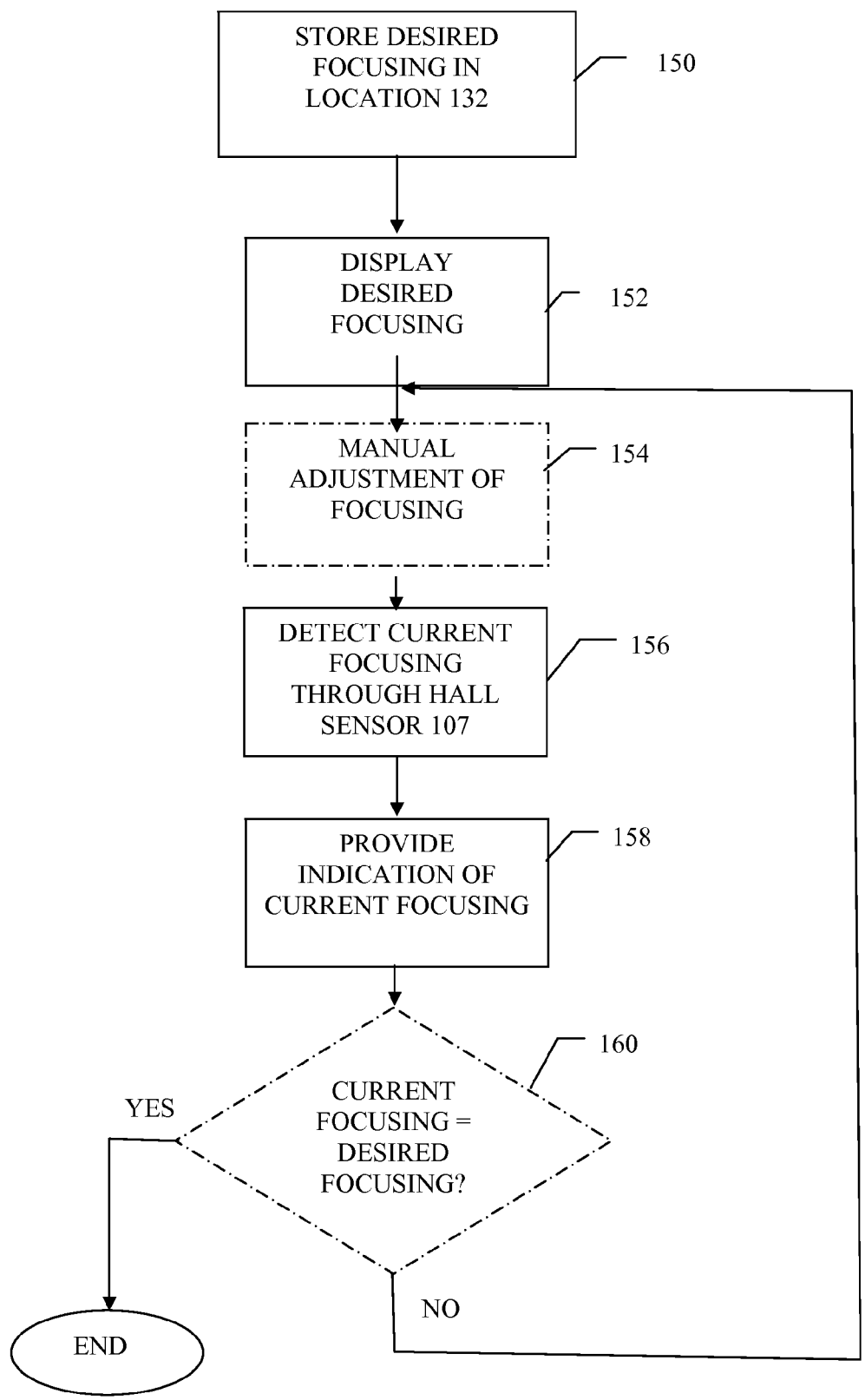
FIGS. 10-13 are flow charts regarding the management of the focusing distance of the optical code reader of FIG. 1.

With reference to the block diagram of FIG. 10, the focusing management functional block 130 provides, in a block 150 performed only once during the step of installation or occasionally according to the needs, upon changes of the application conditions, to store the value of the configuration parameter representing the desired focusing distance into the memory location 132, downloading it into the optical code reader 10 through a programming procedure from a host computer or another storage device connected to the reader, through the communication line provided via cable 22 or in one of the manners described hereinafter. The programming of the parameters in the optical code readers via host computer is well known and thus it shall not be described in grater detail.

In case of loss of the focusing adjustment, in a block 152 the focusing management functional block 130 displays the value of the configuration parameter representing the desired focusing distance stored in the memory location 132, on the display 34 or by lighting up a number of LEDs 30 proportional thereto. By recalling in such manner the desired focusing distance, restoration of the adjustment can be performed by any user, not necessarily by a skilled installer user.

Performance of the block 152 can be controlled for example by pressing the button 24.

Then the user provides for, in a block 154, performing a manual adjustment of the focusing by rotating the element 40. The dash and dots contour of the block 154, and of other blocks in the block diagrams later described, indicates that the step is performed by a user and not by the focusing management functional block 130 of the optical code reader 10.

The focusing management functional block 130 provides for, in a block 156, detecting the current value of the focusing distance, through the Hall sensor 107 and a suitable processing to convert the Hall sensor output signal into a linear measurement and, in a block 158, visually indicating the current focusing distance on the display 34 or by lighting up a given number of LEDs 30.

If the user is satisfied with the displayed current focusing distance, output "YES" from block 160, namely when it corresponds to the desired focusing distance that he/she had read upon display in block 152, he/she will stop rotating the manual focusing distance element 40, thus interrupting the cyclic performance (output "NO" from block 160) of the blocks 154, 156 and 158.

In addition, it will be understood that through the procedure described in FIG. 10, even the first installation or the replacement of the optical code reader 10 may be performed by non-skilled personnel, in case the parameter representing the desired focusing distance is stored in the memory 132 by downloading it from a host computer or another device connected to the reader.

Figure 11:
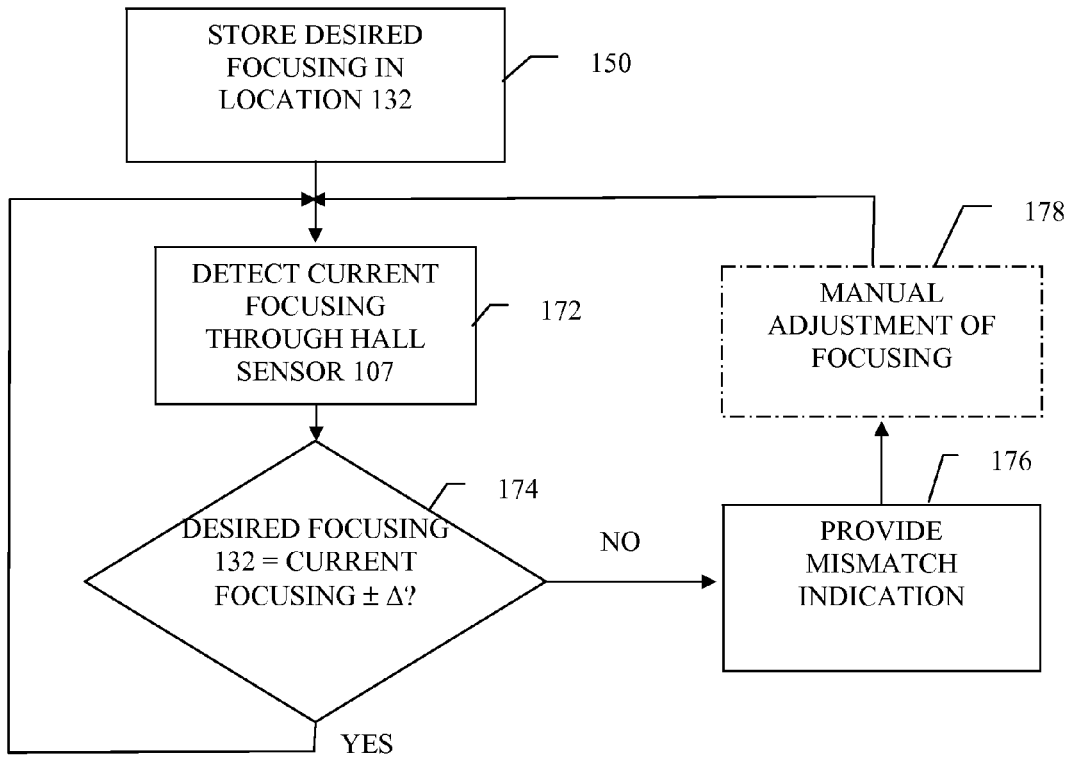

The block diagram of FIG. 11 shows another mode through which the focusing management functional block 130 of the reader 10 according to the invention may facilitate the focusing distance manual adjustment operations and/or provide a diagnostics mode, by detecting the changes in the focusing distance with respect to the desired focusing distance during the step of installation or the variations occurred during normal operation of the optical code reader 10, and signalling them to an operator so that the latter may undertake restoration of the proper adjustment.

In such a block diagram it is again shown that the focusing management functional block 130 provides for, in the block 150 performed only once during the step of installation or occasionally according to the needs, storing in the memory location 132 the value of the configuration parameter representing the desired focusing distance, downloading it into the optical code reader 10 from a host computer or from another device external to the reader through the communication interface provided via cable 22 or according to one of the manners described hereinafter.

During normal operation of the optical reader 10, indeed the focusing management functional block 130 provides for, in a block 172, detecting the current value of the focusing distance, through the Hall sensor 107 and, in a block 174, comparing it with the value of the configuration parameter representing the desired focusing distance stored in the memory location 132.

If the difference between said two values is null or lower than any threshold $\Delta$, output "YES" from block 174, the focusing management functional block 130 returns to detection block 172.

The threshold $\Delta$ can be an absolute value preset in the factory, a value expressed as a percentage preset in the factory of the value of the configuration parameter representing the desired focusing distance stored in the memory location 132, or an absolute or percentage value which can be configured by the user.

On the contrary, if the difference between said two values is not null or greater than the threshold $\Delta$, output "NO" from block 174, the focusing management functional block 130 provides, in a block 176, an mismatch signalling alarm, in the manner described below.

Then the user provides for, in a block 178, performing a manual focusing adjustment by rotating the control element 40.

It should be observed that the focusing management functional block 130 continues to perform cyclically, at high frequency, the steps of the blocks 172, 174 and 176, thus the mismatch indicating alarm is continually provided until the user performs the manual adjustment of the block 178 and until the performed adjustment is such as to lead to or restore the match, possibly apart from the threshold $\Delta$.

The mismatch indicating alarm of the block 176 may comprise one or more indications among a writing on the display 34, a special configuration of lighting up LEDs 30, for example one fixedly lit LED and two blinking lit LEDs, and the delivery of an alarm message to a host computer through the communication line provided via the cable 22.

Delivery of the alarm message to the host computer is particularly advantageous in applications lacking an operator on site, such as typically applications on conveyor belts or in any other automatic machines, namely in the case of an optical code reader 10 of the so-called unattended scanner type.

In addition, it should be observed that signalling through the display 34 and the LEDs 30 is immediately noticed by the user during manual focusing adjustment thanks to the arrangement of the manual adjustment element 40 and of the display 34 and the LEDs 30 on the same side of the housing of the reader 10.

Signalling through the display 34 may simply consists in a writing such as "FOCUSING ALARM", or may also indicate how much is the difference between the current value and the desired value and/or preferably the direction towards which the focusing manual adjustment element 40 should be rotated to obtain or restore the match. The difference between the current value and the desired value can also be displayed in alternation with the current value and the desired value themselves.

An analogous quantitative indication of the value of the difference between the current value and the desired value can be provided by lighting more or fewer LEDs 30, possibly in alternation with the described combination of one fixedly lit LED and two blinking LEDs; the direction towards which the manual focusing adjustment element 40 should be rotated to restore the match can be indicated by associating a LED 30 to the clockwise rotation direction and another LED 30 to the anticlockwise rotation, the suitable LED 30 being again preferably lit in alternation with the described combination of a fixedly lit LED and two blinking LEDs.

As already mentioned, the block 150 for storing in the memory location 132 the value of the configuration parameter representing the desired focusing distance performed by the focusing monitoring functional block 130 according to the block diagrams of FIGS. 10 and 11 can be performed through a programming procedure by a host computer or by another device separate from the reader, through the communication line provided via cable 22.

Alternatively, programming the value of the configuration parameter representing the desired focusing distance can be locally performed.

This may occur, in a first mode, by a proper sequence of pressings of the button 24 in combination with a sort of graphical user interface provided through the display 34 and/or the LEDs 30. For example, prolonged pressing of the button 24 may lead to a programming mode for the desired focusing distance, wherein a minimum value of the focusing distance is proposed on the display 34 and/or through the lighting up of a single LED 30. Any other subsequent non-prolonged pressing of the button 24 may increase the value of the focusing distance proposed on the display 34 and/or through the lighting up of an increasing number of LEDs, up to a proposed maximum value beyond which the minimum value it returned to. A further prolonged pressing of the button 24 leads to the storage of the value currently proposed as the value of the parameter indicating the desired focusing distance in the memory location 132, namely the performance of block 150, and exit from the programming mode.

In another mode, programming the value of the configuration parameter representing the desired focusing distance is locally performed by causing the reader 10 to read a specific optical code encoding a value of the parameter indicating the focusing distance and an instruction to store for the same into the memory location 132, namely the performance of the block 150. The reader 10 shall in that case be provided with a series of optical codes, encoding the same storing instruction, but different values of the parameter indicating the focusing distance.

In case of locally programming the value of the configuration parameter representing the desired focusing distance, advantageously the focusing management functional block 130 may provide an aid to the user.

Figure 12:
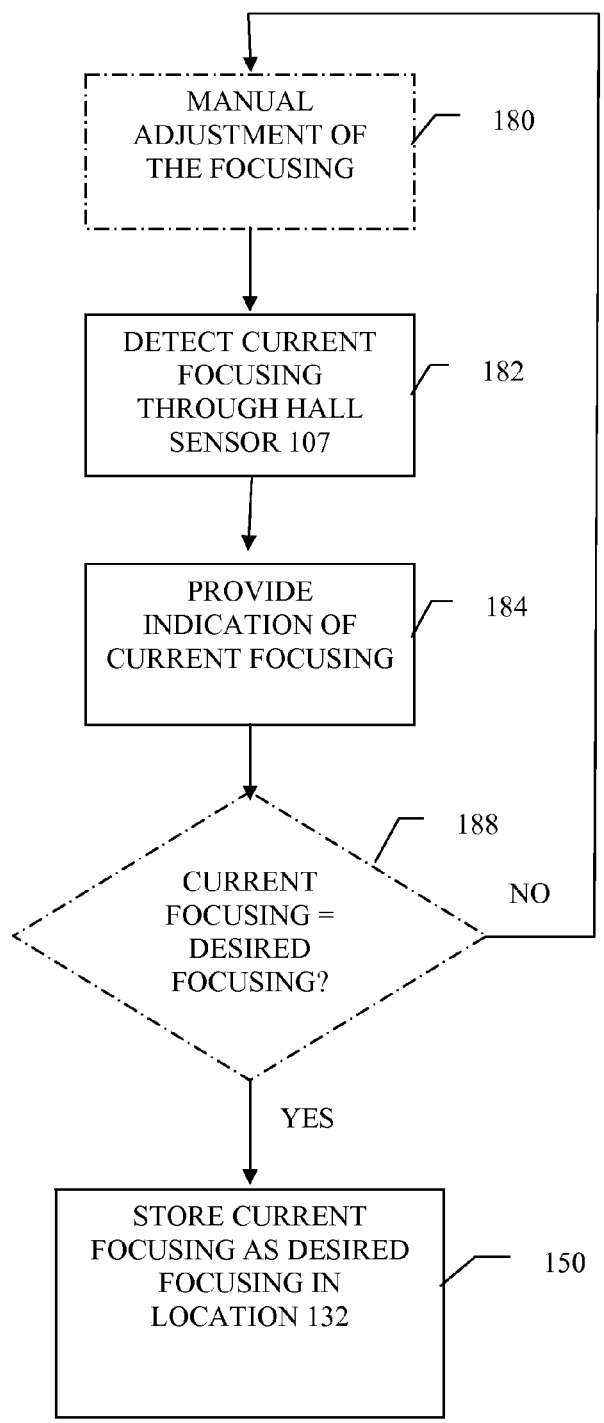

According to FIG. 12, the user provides for, in a block 180, performing a manual focusing adjustment by rotating the element 40. The focusing management functional block 130 provides for, in a block 182, detecting the current value of the focusing distance, through the Hall sensor 107, and, in a block 184, visually indicating the focusing distance on the display 34 or through the lighting up of a given number of LEDs 30.

If the user is satisfied with the visualised current focusing distance, output "YES" from block 188, namely when it corresponds to the desired focusing distance, he/she will stop rotating the manual focusing element 40, thus interrupting the cyclic operation (output "NO" from block 168) of the blocks 180, 182 and 184. Then, the focusing management functional block 130 provides for performing the block 150 for storing in the memory location 132 the current value of the configuration parameter representing the focusing distance as the value of the configuration parameter representing the desired focusing distance.

Performance of the block 150 within the block diagram of FIG. 12 can be controlled by pressing the button 24, or it may automatically occur when the focusing management functional block 130 no longer detects changes in the output of the Hall sensor 107 for a preset period of time, namely for a preset number of performances of the block 182.

While in the above mentioned cases the user is required to know the desired focusing distance in advance, for example by having performed physical measurement of the distance between the input/output window 17 of the reader 10 and the reading position or average reading position of the optical codes, this is not strictly necessary. Indeed, the focusing management functional block 130 can provide a further aid to the user in the manner described with reference to FIG. 13.

The user provides for, in a block 190, performing a manual focusing adjustment by rotating the element 40. At the same time, the optical code reader 10 performs, in a block 192, a series of reading attempts on a sample optical code positioned at the desired reading position or average reading position. In a block 194, a visual indication of the percentage of successful readings of the sample optical code is provided, through the display 34 or through the lighting up of a given number of LEDs 30.

If the user is satisfied with the visualised percentage of successful readings, namely if the current focusing distance corresponds to the desired focusing distance, output "YES" from the block 196, he/she will stop rotating the manual focusing element 40, thus interrupting the cyclic performance of the blocks 190, 192 and 194 (output "NO" from the block 196). Thus, the focusing management functional block 130 provides for performing the block 150 for storing in the memory location 132 the current value of the configuration parameter representing the focusing distance as the value of the configuration parameter representing the desired focusing distance.

Figure 13:
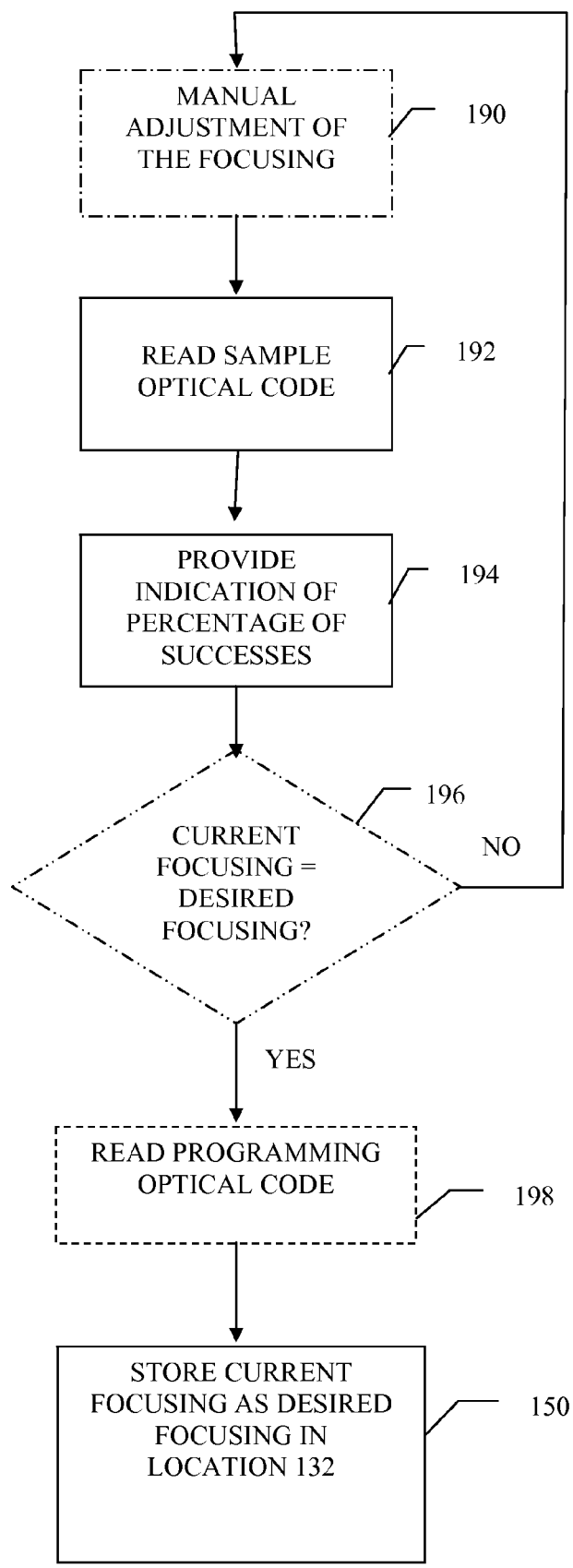

Also within the block diagram of FIG. 13, the performance of the block 150 can be controlled by pressing the button 24, or it might automatically occur when the focusing management functional block 130 no longer detects changes in the output of the Hall sensor 107 for a preset period of time.

According to another particularly advantageous alternative, the performance of the block 150 may be controlled by causing the reader 10 to read, in an optional block 198 as indicated by the dashed contour in FIG. 13, a specific optical code, provided with the reader 10 itself, encoding an instruction for storing the current value of parameter indicating the focusing distance in the memory location 132 as the value of the parameter indicating the desired focusing distance. This performance mode of the block 150 can also be applied to the flow chart described above with reference to FIG. 12.

In this manner, the value of the parameter indicating the desired focusing distance can be completely transparent and unknown to the user. Alternatively, such a value can in any case be displayed for the user in a manner analogous to block 152 of FIG. 10 or to block 184 of FIG. 12 described above, after the performance of the storage block 150 or in a cyclic alternation with the block 194 for indicating the percentage of successful readings.

Regardless of the mode of occurrence of the block 150 for storing the value of the parameter indicating the desired focusing distance, such a value can be advantageously included in a backup procedure on a host computer or on any other suitable external device, through the communication line provided for via cable 22.

The value subjected to backup can be subsequently downloaded into the same reader 10 through a restore procedure, or in a replacement reader 10 in case of replacement, or also into other readers analogous to the optical code reader 10 in an optical code reading system comprising several readers arranged at a same distance from a reading position or average reading position, with manifest advantages.

Merely for completion purposes, it is emphasised that the user interface comprising the button 24, the display 34 and the LEDs 30, is also used for other various functions of the optical code reader 10. For example, the read optical code or the information decoded therefrom, as well as the value of configuration parameters of the reader 10 other than the value representing the desired focusing distance, can be displayed on the display. In addition, also during normal operation of the optical code reader 10, the percentage of successful reading attempts can be displayed, in a manner analogous to the block 194 of FIG. 13 described above.

The operating mode in which the optical code reader 10 is can be displayed through the LEDs, for example providing for: a LED, to which for example a "READY" label can be associated, indicating the ready or normal operation status; a LED, to which for example a "GOOD" label can be associated, indicating the successful result of the reading of an optical code; a LED, to which for example a "TRIGGER" label can be associated, indicating a reading attempt in progress; a LED, to which for example a "COM" label can be associated, indicating a communication in progress over the communication line provided for via cable 22; and a LED, to which for example a "STATUS" label can be associated, to which for example an error status can be associated. Then, the same LEDs can be associated with different indications in combination with pressing the button 24, for example: one of the LEDs, to which for example a second "SETUP" label can be associated, can indicate the passage of the reader 10 into a configuration mode; one of the LEDs, to which for example a second "LEARN" label can be associated, can indicate the passage of the reader 10 into a mode for setting a programming parameter by means of reading optical codes, including the one indicating the desired focusing distance; and one of the LEDs, to which for example a second "TEST" label can be associated, can indicate the passage of the reader 10 into the mode of reading sample optical codes of the block 192 of FIG. 13.

It is manifest that other changes, variants, replacements and integrations can be made to the above described embodiment without thus departing from the scope of the present invention.

Thus, for example, instead of providing two cover parts 14, 16, the cover of the housing of the optical code reader 10 could be made of only one part.

The user interface could comprise only the display 34 or only the LEDs 30, the number of five shown being merely illustrative.

In addition, the user interface could comprise several buttons analogous to the single button 24 illustrated, or also be without buttons, the input controls by the user being commanded only via cable 22 from a host computer or through reading optical codes encoding instructions and possibly configuration parameters.

The manual focusing adjustment element 40, the shaped screw 60 and the interposed insulating element 55 could be replaced by a single-piece manual adjustment element, preferably made of electrical insulating plastic material.

In case of separate elements as illustrated, the rectangular cross-sections of the shank 52 of the manual adjustment element 40, of the split 53, and of the shank 56 of the intermediate insulating element 55, as well as the split 57 of the shaped screw 60, could be replaced by sections of any other geometry adapted to transmit rotational movement, or by other rotation coupling means such as transverse pins, gluing, screwing and similar.

The focusing adjustment transmission element 76 could be hinged like a lever about a pivot pin with the interposition of a helical return spring, in place of the flat spring 80.

The barrel objective 94 could comprise several lenses.

In other designs of the optical code reader 10, wherein it is desired to provide the user interface on the same wall as the input/output window 17 or on the opposite one, the axis of movement of the barrel objective 94 and the forward movement axis of the shaped screw 60 shall be parallel or in particular even coinciding, modifications to the focusing adjustment transmission element 76 being within the skills of the skilled in the art.

The focusing adjustment described above finds an advantageous application also in readers provided with an autofocus system, wherein the rotation of the shaped screw is controlled by an electrical motor, or in manually focused readers, but wherein the manual adjustment element 40 is not accessible at the outside of the reader.

The focusing position sensor could be made, as an alternative to the pair of magnets 106 and the Hall sensor 107, through an optoelectronic device such as a PSD (Position Sensitive Device) or a photodiode coupled with light sources and reflecting sheets or labels, or by means of a potentiometer integral with the shaped screw 60.

The light source 92 could be, as an alternative to a laser diode, a LED or another type of light source.

Alternatively to the retro-reflective configuration shown, it shall be understood that the optical code reader 10 could be of a non-retro-reflective type, by omitting the collecting and deflecting mirror 110 and separating the paths of the light illuminating the optical code and the light diffused by the optical code and collected by the photodetector device 114.

Processing the output signal of the photodetector device 114 could occur entirely or partially outside the optical code reader 10, the decoding functional block 126 of the processor 124 and/or the amplifier/digitiser 122 lacking.

Vice versa, the optical code reader 10 could be totally self-sufficient, the serial interface with the host processor provided via cable 22 lacking.

The memory 125 and in particular the memory location 132 of the configuration parameter representing the desired focusing distance could be external to the processor 124.

The configuration parameter 132 representing the desired focusing distance can be, as an alternative to the distance between the input/output window 17 of the optical code reader 10 and the reading position or average reading position of the optical codes, the position of the focusing adjustment transmission element 76, as detected by the Hall sensor 107 through the position of the pair of magnets 106 integral with the focusing adjustment transmission element 76. In such a case its value stored in the memory location 132 shall be a value expressed in the unit of measurement of the output voltage of the Hall sensor 107, suitably digitised.

According to this alternative, the display on the display 34 shall be in any case expressed as a linear measurement, expressed in centimeters and/or inches, of the focusing distance between the input/output window 17 of the optical code reader 10 and the reading position or average reading position of the optical codes, analogously to the display on the display 34 of the current focusing distance, the focusing management functional block 130 providing for the suitable conversion only when it is required to provide such display.

Still alternatively, the configuration parameter 132 representing the desired focusing distance and/or the display on the display 34 can be the rotation in degrees of the manual focusing adjustment element 40. In such a case, a corresponding graduated scale shall be provided at such manual focusing adjustment element 40.

In addition, the optical code reader 10 may comprise a buzzer or another sound emitting device, used in particular for the emission, in the block 176, of the alarm signalling mismatch between the desired focusing distance and the current focusing distance, alternatively or additionally to the display on the display 34 or through the LEDs 30.

What is claimed is:

1. An optical code reader, wherein the optical code reader comprises optical and electronic components for acquiring and decoding an optical code and a manually operated adjustment mechanism for manually adjusting a focusing distance for acquiring and decoding the optical code, and an electronic memory storing a value of a configuration parameter representing a focusing distance, which value is available to a user to facilitate adjustment of a desired focusing distance.

2. The optical code reader according to claim 1, comprising display means and a processor provided with focusing management program code means adapted to display on said display means a value of the configuration parameter representing the desired focusing distance stored in said electronic memory.

3. The optical code reader according to claim 1, comprising a communication interface with a host computer for communicating the value of the configuration parameter representing the desired focusing distance.

4. The optical code reader according to claim 1, comprising a user interface and a processor provided with focusing management program code means adapted to detect a current focusing distance value and visually indicate through said user interface the detected current focusing distance value, the detected current focusing distance value being detected and visually indicated cyclically during manual operation of said focusing distance adjustment mechanism.

5. The optical code reader according to claim 4, wherein the focusing management program code means is adapted to store in said electronic memory the detected current focusing distance value upon receipt of a storing instruction through said user interface.

6. The optical code reader according to claim 4, wherein the focusing management program code means is adapted to store in said electronic memory the detected current focusing distance value at the end of the manual operation of said focusing distance adjustment mechanism.

7. The optical code reader according to claim 6, wherein the focusing management program code means is adapted to store in said electronic memory the detected current focusing distance value when the detected current focusing distance value is constant for a preset number of cyclic detections.

8. The optical code reader according to claim 6, wherein the focusing management program code means is adapted to store in said electronic memory the detected current focusing distance value when the detected current focusing distance is constant for a preset period of time.

9. The optical code reader according to claim 4, wherein the focusing management program code means is adapted to store in said electronic memory the detected current focusing distance value upon receipt of a storing instruction encoded in an optical code.

10. The optical code reader according to claim 1, comprising a user interface and a processor provided with focusing management program code means adapted to propose through said user interface one of a plurality of values for said configuration parameter representing the desired focusing distance, to receive through said user interface an instruction accepting a currently proposed value, and to store in said electronic memory the currently proposed value upon receipt of said accepting instruction.

11. The optical code reader according to claim 1, comprising a processor provided with focusing management program code means adapted to store in said electronic memory a value of a parameter indicating a focusing distance encoded in an optical code, in response to a storing instruction encoded in said optical code.

12. The optical code reader according to claim 1, wherein the configuration parameter representing the desired focusing distance stored in the memory can be selected from the group consisting of: a distance between an input/output window of the optical code reader and a reading position or average reading position of optical codes; an output value of a position sensor of an element of the focusing distance adjustment mechanism; and a position of a manually operated element of the focusing distance adjustment mechanism.

13. The optical code reader according to claim 1, comprising a user interface and a processor provided with focusing management program code means adapted to interact with said user interface, a manually operated element of said focusing distance adjustment mechanism and said user interface being arranged on a same wall of a housing of the optical code reader.

14. The optical code reader according to claim 1, wherein the focusing distance adjustment mechanism operates on illumination optics of the optical code reader.

15. The optical code reader according to claim 1, wherein a manually operated element of said focusing distance adjustment mechanism is directly accessible at the outside of a housing of the optical code reader.

16. The optical code reader according to claim 1, wherein the optical code reader further comprises a communication interface for communicating with a host computer.

17. An optical code reader comprising a manually operated focusing distance adjustment mechanism, an electronic memory having a configuration parameter representing a desired focusing distance, a user interface and a processor provided with focusing management program code means adapted to cyclically display through said user interface a percentage of successful results of a plurality of reading attempts of a sample optical code, and to detect a current value of a parameter indicating a focusing distance and to store it in said electronic memory upon receipt of a storing instruction when said percentage of successful results is satisfactory.

18. The optical code reader according to claim 17, wherein the focusing management program code means is adapted to receive said storing instruction through said user interface.

19. The optical code reader according to claim 17, wherein the focusing management program code means is adapted to receive said storing instruction from detection of the end of manual operation of said focusing distance adjustment mechanism.

20. The optical code reader according to claim 19, wherein the focusing management program code means is adapted to store in said electronic memory the detected current value when the detected current value is constant for a preset number of said cyclic displays.

21. The optical code reader according to claim 19, wherein the focusing management program code means is adapted to store in said electronic memory the detected current value when the detected current value is constant for a preset period of time.

22. The optical code reader according to claim 17, wherein the focusing management program code means is adapted to receive said storing instruction, wherein said storing instruction is encoded in an optical code.

23. An optical code reader comprising a manually operated focusing distance adjustment mechanism, an electronic memory having a configuration parameter representing a desired focusing distance, display means and a processor provided with focusing management program code means adapted to display on said display means a value of the configuration parameter representing the desired focusing distance stored in said electronic memory,
wherein the focusing management program code means is additionally adapted to detect current focusing distance value, to compare it with the value of the configuration parameter representing the desired focusing distance stored in the electronic memory and, when the difference between said two values is not null or greater than a threshold, to provide a mismatch alarm signal.

24. The optical code reader according to claim 23, wherein the threshold is selected from the group consisting of an absolute value-preset in a factory, a value expressed as a percentage preset in the factory of the value of the configuration parameter representing the desired focusing distance stored in the electronic memory, and an absolute or percentage value which can be configured by a user.

25. The optical code reader according to claim 23, comprising a communication interface with a host computer, and the focusing management program code means is adapted to provide said alarm signal through said communication interface.

26. The optical code reader according to claim 23, comprising display means and the focusing management program code means is adapted to provide said alarm signal through said display means.

27. The optical code reader according to claim 26, wherein the focusing management program code means is additionally adapted to cyclically perform said detection, comparison and alarm signal provision.

28. The optical code reader according to claim 23, wherein the alarm signal indicates said difference between the current focusing distance value and the value of the configuration parameter representing the desired focusing distance stored in the electronic memory.

29. The optical code reader according to claim 23, wherein the alarm signal indicates a direction according to which the manually operated focusing adjustment mechanism should be operated to restore a match between the current focusing distance value and the value of the configuration parameter representing the desired focusing distance stored in the electronic memory.

30. The optical code reader according to claim 23, wherein a manually operated element of said focusing distance adjustment mechanism is directly accessible at the outside of a housing of the optical code reader.

* * * * *